United States Patent
Parsadayan

(10) Patent No.: US 12,480,806 B2
(45) Date of Patent: Nov. 25, 2025

(54) SYSTEMS AND METHODS FOR CONTACT MICROPHONES

(71) Applicant: Intelligent Entry Machines LLC, Irvine, CA (US)

(72) Inventor: Andrew Parsadayan, Newport Coast, CA (US)

(73) Assignee: Intelligent Entry Machines LLC, Irvine, CA (US)

( * ) Notice: Subject to any disclaimer, the term of this patent is extended or adjusted under 35 U.S.C. 154(b) by 455 days.

(21) Appl. No.: 18/164,347

(22) Filed: Feb. 3, 2023

(65) Prior Publication Data

US 2023/0250687 A1    Aug. 10, 2023

Related U.S. Application Data

(60) Provisional application No. 63/306,730, filed on Feb. 4, 2022.

(51) Int. Cl.
*G01H 1/00* (2006.01)
(52) U.S. Cl.
CPC ............ *G01H 1/00* (2013.01); *E05Y 2400/44* (2013.01)
(58) Field of Classification Search
None
See application file for complete search history.

(56) References Cited

U.S. PATENT DOCUMENTS

| 6,523,413 | B1 | 2/2003 | Hoshino et al. | |
|---|---|---|---|---|
| 8,387,777 | B2 * | 3/2013 | Tokhtuev | B65G 43/02 |
| | | | | 198/810.04 |
| 9,406,207 | B2 * | 8/2016 | Parsadayan | E05F 15/643 |
| 9,465,461 | B2 | 10/2016 | Holz | |
| 10,448,919 | B2 | 10/2019 | Leal et al. | |
| 2005/0157888 | A1 | 7/2005 | Yang | |
| 2019/0025259 | A1 | 1/2019 | Magnusson | |
| 2020/0400736 | A1 | 12/2020 | Severns et al. | |
| 2021/0183227 | A1 | 6/2021 | Kovscek et al. | |
| 2023/0108988 | A1 * | 4/2023 | Learmonth | G01R 31/392 |
| | | | | 49/31 |

* cited by examiner

*Primary Examiner* — Suman K Nath
(74) *Attorney, Agent, or Firm* — Martin Fessenmaier; Umberg Zipser LLP

(57) ABSTRACT

A barrier operator system such as a residential or industrial access gate system comprises a plurality of components that are mechanically coupled to each other to so form an acoustic chain. Once or more contact microphones are coupled to one or more of the components and used to ascertain operation and functional status of the gate system, and to identify potential or actual modes of failure via determination of acoustic signatures that are indicative of the status and/or failure.

20 Claims, 3 Drawing Sheets

---

Use a contact microphone to transduce a vibration event within an acoustic chain into an electronic signal, wherein the acoustic chain is formed by a plurality of mechanically or structurally coupled components of a barrier operator system, and wherein the contact microphone is coupled to at least one of the plurality of components

⬇

Analyze the electronic signal in a signal processor to:

⬇

Determine an operational status of the barrier operator system,

⬇

Determine a functional status of at least one of the plurality of mechanically or structurally coupled components in the barrier operator system, and/or

⬇

Determine an external event affecting at least one of the plurality of mechanically or structurally coupled components in the barrier operator system Couple a contact microphone to at least one of a plurality of components of a barrier operator system, wherein the components are mechanically coupled together to form an acoustic chain, and wherein the contact microphone transduces a vibration event within the acoustic chain into an electronic signal

↓

Electronically couple a signal processor to the contact microphone, wherein the signal processor is programmed to analyze the electronic signal to thereby determine:

↓

(a) an operational status of the barrier operator system,

↓

(b) a functional status of at least one of the plurality of mechanically or structurally coupled components in the barrier operator system, and/or

↓

(c) an external event affecting at least one of the plurality of mechanically or structurally coupled components in the barrier operator system

FIG. 3

SYSTEMS AND METHODS FOR CONTACT MICROPHONES

This application claims priority to our US Provisional patent application with the Ser. No. 63/306,730, which was filed Feb. 4, 2022, and which is incorporated by reference herein.

FIELD OF THE INVENTION

The field of the invention is systems, devices, and methods of monitoring or controlling operation of barrier operators, particularly as it relates to residential and industrial gates that limit access to an access-controlled area.

BACKGROUND

The following description includes information that may be useful in understanding the present invention. It is not an admission that any of the information provided herein is prior art or relevant to the presently claimed invention, or that any publication specifically or implicitly referenced is prior art.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Automated barriers such as residential gate systems typically operate in an automated manner and are at least in some cases responsive to certain external signals such as obstruction or an object blocking a moving gate. For example, U.S. Pat. No. 7,057,519 uses an obstacle detection sensor as a safe-operation sensor to avoid damage to a gate or object or person. More recently, motion and tilt have been sensed to identify undesirable strain without barrier operator force as an input as described in U.S. Pat. No. 9,371,678. Here, a barrier sensor device detects both motion and tilt of a barrier, and by monitoring these two aspects of barrier operation, the barrier sensor device compiles data that can be analyzed by a control device and compared to un-strained or previously compiled barrier operator data to determine whether the barrier operator system is under strain and requires service. While conceptually relatively simple, various difficulties exist. Among other problems, seasonal changes or variation in temperature, and/or temporary obstruction or changes to the barrier (e.g., addition of signage or ornaments) may interfere with the monitoring operation.

Contact microphones have been used in numerous applications, and most notably in the entertainment industry to generate new sounds. However, beyond entertainment, contact microphones have also been employed in the medical field, for example, in electronic stethoscopes as described in US 2005/0157888. In other medical areas, U.S. Pat. No. 10,448,919 teaches use of acoustic transducers to non-invasively evaluate joint function and degenerative joint conditions. However, contact microphones have only found limited acceptance in medicine. On the other hand, US 2019/0025259 teaches use of contact microphones to detect freezing or imminent freezing conditions in water pipes, and U.S. Pat. No. 9,465,461 teaches use of multiple contact microphones coupled to a floor surface to identify position of an individual in low light conditions to enhance optical tracking. Similarly, U.S. Pat. No. 6,523,413 teaches use of a contact microphone to detect blemishes in the surface of a hard drive disk. While such uses allow for detection of certain events, they nevertheless remain limited in their utility.

Therefore, while various applications of contact microphones are known in the art, all or almost all of them are limited to specific functions. Moreover, such uses are also typically limited to the detection of specific defined events and single component devices. Consequently, there is still a need for improved systems and methods for contact microphones, especially where such microphones can be employed to monitor and/or ascertain operation and condition of multiple components that form an acoustic chain in a mechanical system such as barrier operator system.

SUMMARY OF THE INVENTION

The inventor has now discovered that one or more contact microphones can be used in various devices, systems, and methods, especially as they relate to a barrier operator systems, in which a plurality of components are mechanically coupled to each other to so form an acoustic chain. Advantageously, such systems allow monitoring of operational and functional status of the components in the devices and systems and further allow for detection of pre-failure and failure states (e.g., due to ageing or compromise of a component in the acoustic chain).

In one aspect of the inventive subject matter, the inventor contemplates a barrier operator system that includes a plurality of components that are mechanically coupled together to so form an acoustic chain of a barrier operator system. A contact microphone is then coupled to at least one of components and configured to transduce a vibration event within the acoustic chain into an electronic signal. Most typically, a signal processor is electronically coupled to the contact microphone and programmed to analyze the electronic signal to so determine (a) an operational status of the barrier operator system, (b) a functional status of at least one of the plurality of mechanically or structurally coupled components in the barrier operator system, and/or (c) an external event affecting at least one of the plurality of mechanically or structurally coupled components in the barrier operator system.

In most common embodiments, the components that form the acoustic chain will include a barrier operator, a sprocket, a chain, a linear arm, a hinge assembly, a roller assembly, a gate panel, and/or a magnetic lock. Therefore, the barrier operator system may be configured as a sliding gate barrier operator system or as a swinging gate barrier operator system. Moreover, it is contemplated that the contact microphone comprises a piezoelectric transducer or a planar magnetic transducer, and/or that the contact microphone is wirelessly coupled to the signal processor. As will be readily appreciated, contemplated barrier operator systems may include at least a second contact microphone that is coupled to at least one other of the plurality of components e.g., to so allow for positional identification of the vibration event). Among other events, typical vibration events include vibration caused by friction, vibration caused by chain-and-sprocket engagement, vibration caused by motor operation, and vibration caused by impact.

In further embodiments it is generally preferred that the signal processor is a digital signal processor. Suitable operational statuses include opening the barrier operator system to grant access, closing the barrier operator system to deny access, locking the barrier operator system to deny access, and/or non-movement of the plurality of components. Likewise, suitable functional statuses include normal operation within design parameters, compromised operation outside design parameters, and/or age of at least one of the plurality of components, while contemplated external event include an impact on at least one of the plurality of components.

Therefore, in another aspect of the inventive subject matter, the inventor also contemplates a method of monitoring or controlling operation of a barrier operator system that includes a step of using a contact microphone to transduce a vibration event within an acoustic chain into an electronic signal. Most typically, the acoustic chain is formed by a plurality of mechanically or structurally coupled components of a barrier operator system, and the contact microphone is coupled to at least one of the plurality of components. In still further contemplated steps of such method, the electronic signal is analyzed in a signal processor to determine an operational status of the barrier operator system, a functional status of at least one of the plurality of mechanically or structurally coupled components in the barrier operator system, and/or an external event affecting at least one of the plurality of mechanically or structurally coupled components in the barrier operator system.

As noted above, at least one other contact microphone may be used to transduce the vibration event from a second and distinct location within the acoustic chain, and in at least some embodiments the contact microphone may be wirelessly coupled to the signal processor. With respect to the components, the access control configuration, and the vibration event, the operational status, the functional status, and the external event, the same considerations as noted above apply.

It is still further contemplated that the electronic signal is analyzed in the signal processor using a library of known electronic signal signatures. For example, the electronic signal may comprise a plurality of electronic signal signatures, each signature corresponding to the operation of respective components.

Consequently, and viewed form a different perspective, the inventor also contemplates a method of modifying a barrier operator system. Most typical methods will include a step of coupling a contact microphone to at least one of a plurality of components of a barrier operator system wherein the components are mechanically coupled together to form an acoustic chain, and wherein the contact microphone transduces a vibration event within the acoustic chain into an electronic signal; and another step of electronically coupling a signal processor to the contact microphone. In such methods, the signal processor is preferably programmed to analyze the electronic signal to thereby determine (a) an operational status of the barrier operator system, (b) a functional status of at least one of the plurality of mechanically or structurally coupled components in the barrier operator system, and/or (c) an external event affecting at least one of the plurality of mechanically or structurally coupled components in the barrier operator system. Preferably, but not necessarily, the signal processor is electronically coupled with a controller that controls operation of the barrier operator.

Various objects, features, aspects, and advantages of the inventive subject matter will become more apparent from the following detailed description of preferred embodiments, along with the accompanying drawing figures in which like numerals represent like components.

BRIEF DESCRIPTION OF THE DRAWINGS

FIG. 3 is a flowchart depicting an exemplary method of retrofitting an existing barrier operator system.

DETAILED DESCRIPTION

The inventor has now discovered that one or more contact microphones can be readily implemented in a variety of barrier operator systems to so allow for real-time acquisition of operational parameters and/or status parameters within the barrier operator system, and even to alert of events external to the barrier operator system. In this context, it should be especially appreciated that a large number of components (and in fact all of the moving components) in a barrier operator system are mechanically coupled to each other in such a manner as to form an acoustic chain.

The term "acoustic chain" as used herein refers to a plurality of components that are mechanically coupled to each other such that a sound or vibration in a first component is detectable in a second component, wherein first and second components may be directly coupled to each other or may be coupled to each other indirectly via at least a third component. As will be readily appreciated, the coupling of at least two components may be via a hinge, a weld, a screw, a telescoping rod, a chain, a sprocket, a control arm, etc.

Figure 1:
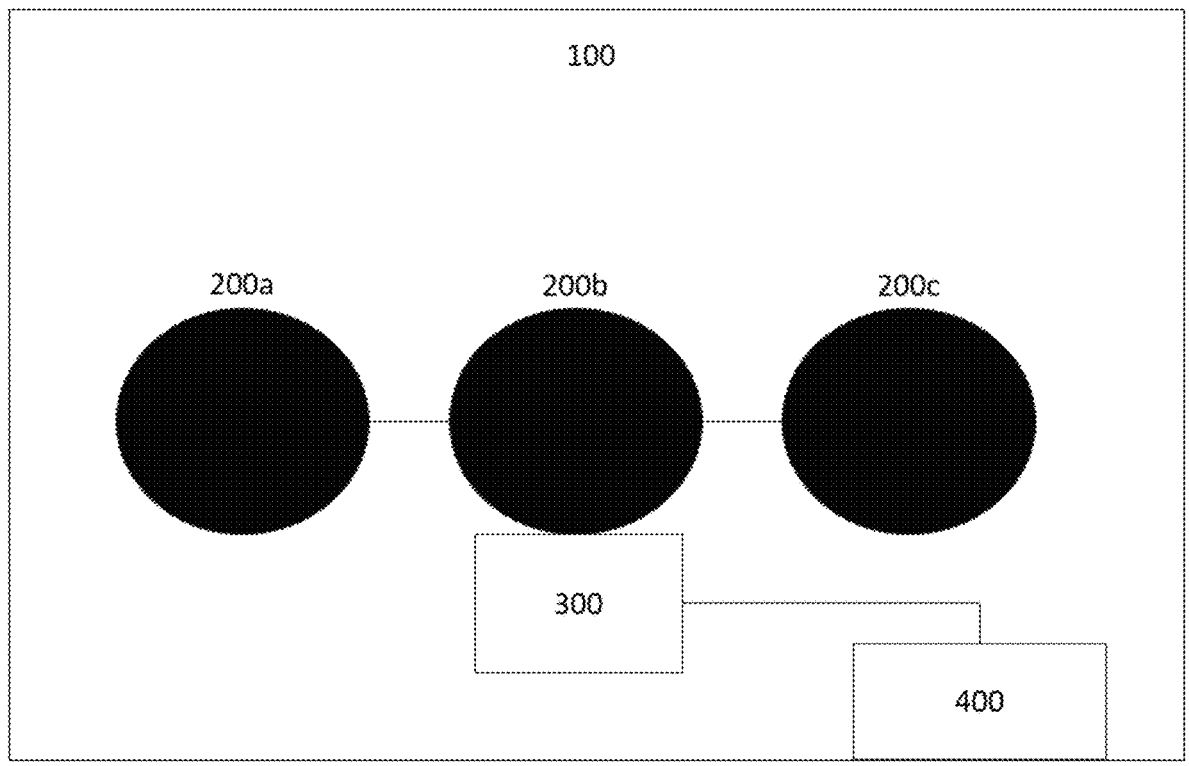
FIG. 1 is a schematic diagram depicting an exemplary barrier operator system.
Figure 2:
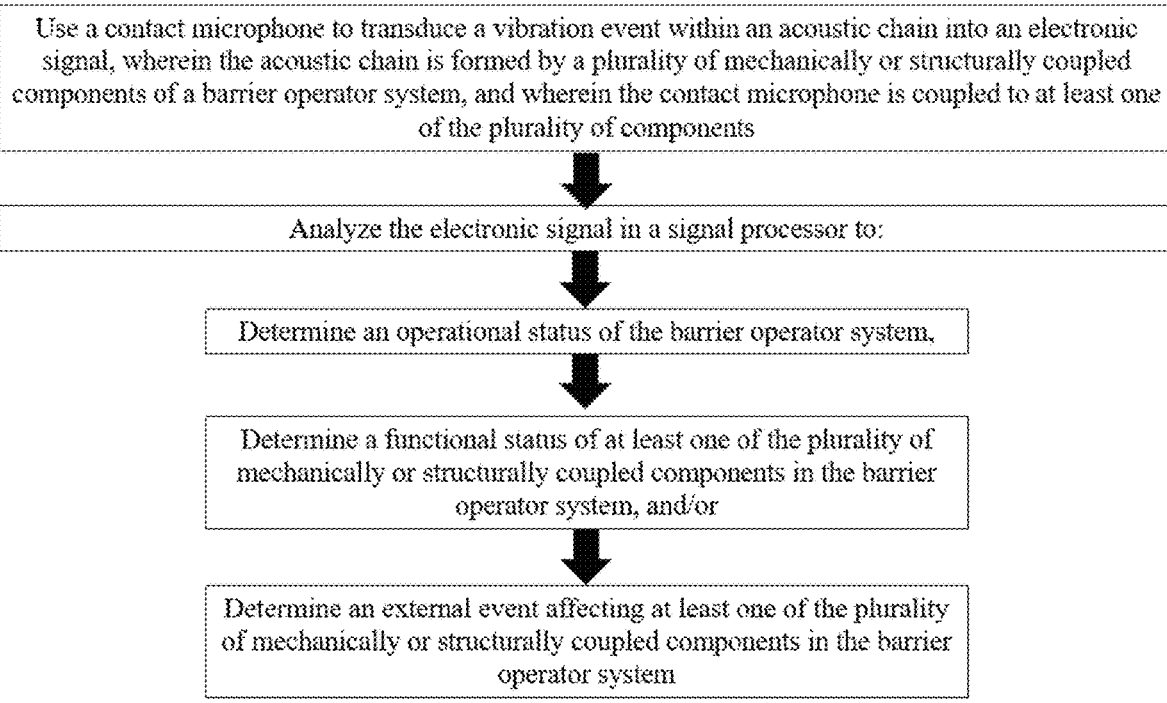
FIG. 2 is a flowchart depicting an exemplary method of monitoring or controlling operation of a barrier operator system.

In one exemplary embodiment, a barrier operator system may comprise a barrier operator that includes housing that encloses a motor that is coupled to a gear box, which in turn is coupled to a single or dual control arm that then hingedly connects to a pivoting gate panel. As will be readily recognized, all of these components will form an acoustic chain that will be able to transmit any sound or vibrational pattern throughout the chain. In another exemplary embodiment, a barrier operator system may comprise a barrier operator that includes housing that encloses a motor that is coupled to a set of sprockets, which in turn is coupled to a chain that then connects to a sliding or rolling gate panel. Once more, it will be readily recognized that all of these components will form an acoustic chain that will be able to transmit any sound or vibrational pattern throughout the chain. In addition, each of the gate panels may include a plate that connects to a magnetic lock, and/or may comprise one or more wheels that support at least some of the weight of the gate panel. It should be appreciated that the barrier operator system 100, in other embodiments, may comprise a plurality of components 200 mechanically coupled together to form an acoustic chain in the barrier system 100, a contact microphone 300 coupled to at least one of the plurality of components 200 and configured to transduce a vibration event within the acoustic chain into an electronic signal, and a signal processor 400 electronically coupled to the contact microphone 300 and programmed to analyze the electronic signal to thereby determine (a) an operational status of the barrier operator system 100, (b) a functional status of at least one of the plurality of mechanically or structurally coupled components 200 in the barrier operator system 100, and/or (c) an external event affecting at least one of the plurality of mechanically or structurally coupled components 200 in the barrier operator system 100. See FIG. 1. Further, FIG. 2 is a flowchart depicting an exemplary method of monitoring or controlling operation of a barrier operator system. Additionally, FIG. 3 is a flowchart depicting an exemplary method of retrofitting an existing barrier operator system.

Regardless of the particular type and/or operation of the barrier operator system, it is thus contemplated that at least two, or at least three, or at least four, or at least five, or at least six, or at least seven, or even more components of the barrier operator system are mechanically coupled to each other such that these components will form an acoustic chain. Most typically, but not necessarily, all of the components (other than the housing of the barrier operator) within the acoustic chain will be moving components. Therefore, typical component of the acoustic chain include a motor, a gearbox or sprocket (assembly), hinges and/or chain(s), control arm(s), gate panels, wheels, etc. Other, non-moving components include welds, pins, screws, etc. Viewed form a different perspective, the members of the acoustic chain will typically be coupled to each other such that one portion of one component will make firm and physical contact with another portion of another component. Of course, it should be appreciated that such firm and physical contact may also involve lubricants, bushings, bearings, etc. Consequently, while swinging and sliding residential barrier operator systems are particularly contemplated, all other types of (e.g., residential and industrial) barrier operator systems are also deemed suitable for use herein and therefore also include garage door operator systems, swinging barrier(s) barrier operator systems, turn style barrier operator systems, retractable wing style barrier operator systems, and other systems as described in the UL 325 Standard (incorporated by reference herein).

With respect to other components of contemplated barrier operator system that do not form part of the acoustic chain, it should be appreciated that all known components are deemed suitable for use herein and particularly include electronic controllers that control the operation of a barrier operator, optical or wireless remote control devices that cooperate with the controller to open or restrict access, back-up power supplies, and ancillary devices such as video cameras, audio communication devices, lighting equipment, etc.

In particularly preferred aspects of the inventive subject matter, it is contemplated that at least one contact microphone is directly coupled to at least one component of the barrier operator system, and most typically to at least one component of the acoustic chain. As will be readily appreciated, the type of contact microphone is not limiting to the inventive subject matter, and suitable contact microphones may be configured as piezoelectric transducers, as planar magnetic transducers, as magnetic transducer, and even as microelectromechanical system (MEMS; see e.g., US 2021/0127202). There are numerous commercially available contact microphones known in the art and all of these are deemed suitable for use herein. Furthermore, it should be appreciated that depending on the type of contact microphone, a pre-amplifier may be advantageously employed.

Most typically, contemplated systems and methods will use at least one contact microphone that is coupled to a component of the barrier operator system, and preferably to a member of the acoustic chain. For example, the contact microphone may be coupled to the housing of the barrier operator, where the housing forms part of the acoustic chain (e.g., via mechanical coupling to the motor or gear box or sprocket (assembly). In another example, the contact microphone may be coupled to the gear box, control arm, or gate panel. As will be readily appreciated, use of a wireless transmitter that is coupled to the contact microphone is especially preferred where the contact microphone is in a position distal to the barrier operator and/or controller that controls operation of the barrier operator.

In addition, it should be appreciated that the contact microphone(s) may not only wirelessly communicate with its associated signal processor, but where desired, the contact microphone and the associated signal processor may wirelessly/remotely communicate with the associated barrier operator or another nearby device (like some sort of access entry authentication system or on-site maintenance system). This can be an independently sold device for general purpose monitoring with the goal of alerting a manager, installer, or owner of potential issues. Moreover, it should be recognized that the contact microphone and/or signal processor may be communicatively coupled to each other via a local or distributed data network (e.g., private LAN, internet, wireless telephone network, etc.). As such, it should be appreciated that contemplated systems are also applicable as a retrofit to an existing installation (e.g., to build a sound profile for a particular installation and weeding out types of detection events that can be correlated across installations to identify problematic/unhealthy old installations). Still further, it should be appreciated that contemplated systems can also receive (typically in a wireless manner) communications that can change or update frequency or level of detail of any reports, or change or update algorithms for signal processing, operational data, and/or profiles. Conversely, sound profiles or processed data, statistics about types of events, failures, obstruction, etc. can also be sent or received over the internet other data carrier (e.g., from portable storage device).

Therefore, in still further contemplated embodiments, it should be appreciated that that contact microphone(s), alone or in combination with associated control circuitry, may wirelessly communicate with a computing system that is not part of the contact microphone(s) installation. For example, such off-site computing system may be a server, dedicated or shared computing device, tablet, cellular phone, etc., which may be owned or operated by a third party such as a user, an installer, a vendor, etc. Consequently, such wireless communication may be used to provide status information, information about the operation and/or integrity of the operator system and its components and may even be used as a remote control for a user passing through the barrier system.

In further contemplated aspects, systems and methods presented herein may also include more than one contact microphone, and it is particularly preferred that where two or more contact microphones are installed, the positioning of the two contact microphones will be at different components of the acoustic chain. For example, one contact microphone may be coupled to the barrier operator, motor, or gear box, while a second contact microphone may be coupled to a gate panel. In this context, it should be recognized that use of multiple contact microphones will not only provide redundancy but will facilitate identification of the location of a particular sound using determination of time difference for a sound signature or peak.

Regardless of the number of contact microphones used, however, it should be appreciated that each component will produce a specific sound signature that directly translates into a specific electronic signature. For example, motion at a hinge of a swinging gate will have an electronic signature that is distinct from the electronic signature created by the motion of a wheel. Likewise, different motor speeds will generate different electronic signatures. Therefore, it should be appreciated that each component in the acoustic chain will not only have its own acoustic and electronic signature, but that changes in the components will also have corresponding changes in the respective acoustic and electronic signature. Thus, operation and operational condition of each of the components of the acoustic chain can therefore be recognized and monitored in a single analysis using a single electronic signature.

Viewed from a different perspective, it should be appreciated that each component and its operational and functional state can be associated with a particular vibration event and/or signature. For example, vibration events contemplated herein include vibration caused by friction, vibration caused by chain-and-sprocket engagement, vibration by motion, vibration caused by motor operation, and vibration caused by impact (e.g., rain impacting a gate panel, or a car or pedestrian hitting a gate). As such, the sound acquired by a contact microphone can be viewed as a symphony of sounds events produced by different players (at the same time or in sequence), and that the signal processor can isolate a signature of a single player. Therefore, operational status such as opening the barrier operator system to grant access, closing the barrier operator system to deny access, locking the barrier operator system to deny access, and/or non-movement of the plurality of components can be easily monitored by detection of the vibration event associated with one or more (or all) of the moving parts of the acoustic chain. Similarly, the functional status for any one of the components can be analyzed to ascertain whether or not the component is indicative for normal operation within design parameters, for compromised operation outside design parameters, and/or for the age of at least one of the plurality of components.

In yet further contemplated aspects, it is contemplated that the vibration event need not necessarily originate from motion of one or more components within the acoustic chain, but that one or more vibration sources may be coupled to the acoustic chain to generate a vibration signal. As will be readily appreciated, such vibration sources may have numerous configurations and may be include locks, one or more electromagnetic or pneumatic actuators, gear mechanisms, etc., so long as such sources can produce a vibration signal or signature in the acoustic chain. Of course, the vibration signal or signature may be constant or change in frequency, may be polyphonic or only use a single frequency, and/or may be 'tuned' to one or more specific frequencies to so allow querying distinct elements within the acoustic chain. Therefore, vibration events may also be generated on demand (e.g., as part of a service routine).

As will be readily appreciated, analysis of the electronic/acoustic signals can be done in a variety of manners and all manners of acoustic analyses are deemed suitable for use herein. However, it is especially contemplated that the analysis is performed using one or more digital signal processors. For example, each of the components in the acoustic chain may be characterized by a set of unique acoustic parameters such as frequency, phase, amplitude, attack, decay, resonance frequencies, and time positions relative to signals from other components. In such event, any deviation from a (pre) determined set of unique parameters may be used to detect ageing, malfunction, or even a defect. Alternatively, or additionally, acoustic/electronic signatures may be learned after installation using a machine learning and/or artificial intelligence system. Of course, where multiple contact microphones are used, the position of the component may be simply calculated from the time positions between the signals of the multiple contact microphones. Thus, the electronic signal may be analyzed in the signal processor using a library of known electronic signal signatures. For example, acoustic signatures may be acquired in a specific installation (or for a specific installation type) and machine learning may be employed to interpret acoustic signatures as is disclosed in US 2021/0183227.

Therefore, it should be appreciated that dedicated sensors that would otherwise be needed for identification of proper operation or status of a single component in a barrier operator system can now be eliminated. Indeed, the contact microphone(s) contemplated herein can identify the operation, status, and condition of a component to which the microphone is not directly coupled. Moreover, contact microphones may even be used to detect external events such as rain, tampering, or impact by detection of vibrational patterns characteristic for such external events. Moreover, external events also include changes in operating conditions such as deceleration from track or chain conditions or collisions from rocks or other obstacles.

In still further contemplated aspects, it should be appreciated that the systems and methods presented herein may not only be useful for monitoring of operation and proper function, but may also be implemented in installation or servicing a barrier operator system. For example, gate opening time and/or speed may be readily translated into an acoustic signature that represents these parameters. In another example, the hit point of a gate at opening and closing may be detected without the need of an installer being present at the gate. Likewise, manual operation of a newly installed system may afford the signal processor an opportunity to identify the installed components and to set up control parameters accordingly. To that end, it should also be noted that each of the components of the acoustic chain may be 'tuned' to generate a characteristic acoustic signature. Such tuning may make use of the inherent resonance frequency of the component or may make use of a specific element that is added to the component to so act as a 'tuning fork' (along or in combination with the component).

Additionally, it should be recognized that the contact microphone setup (and any associated electronic components such as a signal processor) may be installed independently of the barrier operator or may even run off of independent power. However, it is typically preferred that the signal processor will be operationally coupled to the barrier operator control circuitry. Thus, the contact microphone systems as contemplated herein may also be installed as a retrofit system to an already existing barrier operator system.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements. Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise. Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A barrier operator system, comprising:
    a plurality of components mechanically coupled together to form an acoustic chain in the barrier operator system;
    a contact microphone coupled to at least one of the plurality of components and configured to transduce a vibration event within the acoustic chain into an electronic signal;
    a signal processor electronically coupled to the contact microphone and programmed to analyze the electronic signal to thereby determine
        (a) an operational status of the barrier operator system,
        (b) a functional status of at least one of the plurality of mechanically or structurally coupled components in the barrier operator system, and/or
        (c) an external event affecting at least one of the plurality of mechanically or structurally coupled components in the barrier operator system.

2. The barrier operator system of claim 1, wherein the plurality of components comprise one or more of a barrier operator, a sprocket, a chain, a linear arm, a hinge assembly, a roller assembly, a gate panel, and a magnetic lock.

3. The barrier operator system of claim 1, wherein the barrier operator system is configured as a sliding gate barrier operator system or a swinging gate barrier operator system.

4. The barrier operator system of claim 1, wherein the contact microphone comprises a piezoelectric transducer or a planar magnetic transducer, and/or wherein the contact microphone is wirelessly coupled to the signal processor.

5. The barrier operator system of claim 1, further comprising a second contact microphone coupled to at least one other of the plurality of components.

6. The barrier operator system of claim 1, wherein the vibration event is selected from the group consisting of vibration caused by friction, vibration caused by chain-and-sprocket engagement, vibration caused by motor operation, and vibration caused by impact.

7. The barrier operator system of claim 1, wherein the operational status is opening the barrier operator system to grant access, closing the barrier operator system to deny access, locking the barrier operator system to deny access, and/or non-movement of the plurality of components.

8. The barrier operator system of claim 1, wherein the functional status is normal operation within design parameters, compromised operation outside design parameters, and/or age of at least one of the plurality of components.

9. The barrier operator system of claim 1, wherein the external event is an impact on at least one of the plurality of components, and/or a deceleration of track or chain conditions.

10. A method of monitoring or controlling operation of a barrier operator system, comprising:
    using a contact microphone to transduce a vibration event within an acoustic chain into an electronic signal;
    wherein the acoustic chain is formed by a plurality of mechanically or structurally coupled components of the barrier operator system, and wherein the contact microphone is coupled to at least one of the plurality of components; and
    analyzing the electronic signal in a signal processor to
        determine an operational status of the barrier operator system,
        determine a functional status of at least one of the plurality of mechanically or structurally coupled components in the barrier operator system, and/or
        determine an external event affecting at least one of the plurality of mechanically or structurally coupled components in the barrier operator system.

11. The method of claim 10, wherein the contact microphone is wirelessly coupled to the signal processor.

12. The method of claim 10, wherein the plurality of components comprise one or more of a barrier operator, a sprocket, a chain, a linear arm, a hinge assembly, a roller assembly, a gate panel, and a magnetic lock, and/or wherein the barrier operator system is configured as a sliding gate barrier operator system or a swinging gate barrier operator system.

13. The method of claim 10, wherein the vibration event is selected from the group consisting of vibration caused by friction, vibration caused by chain-and-sprocket engagement, vibration caused by motor operation, and vibration caused by impact.

14. The method of claim 10, wherein the electronic signal is analyzed in the signal processor using a library of known electronic signal signatures.

15. The method of claim 10, wherein the electronic signal comprises a plurality of electronic signal signatures, each signature corresponding to the operation of respective components.

16. The method of claim 10, wherein the operational status is opening the barrier operator system to grant access, closing the barrier operator system to deny access, locking the barrier operator system to deny access, and/or non-movement of the plurality of components, wherein the functional status is normal operation within design parameters, compromised operation outside design parameters, and/or age of at least one of the plurality of components, and/or wherein the external event is an impact on at least one of the plurality of components.

17. A method of retrofitting an existing barrier operator system, comprising:
   coupling a contact microphone to at least one of a plurality of components of the barrier operator system, wherein the components are mechanically coupled together to form an acoustic chain, and wherein the contact microphone transduces a vibration event within the acoustic chain into an electronic signal; and
   electronically coupling a signal processor to the contact microphone;
   wherein the signal processor is programmed to analyze the electronic signal to thereby determine
      (a) an operational status of the barrier operator system,
      (b) a functional status of at least one of the plurality of mechanically or structurally coupled components in the barrier operator system, and/or
      (c) an external event affecting at least one of the plurality of mechanically or structurally coupled components in the barrier operator system.

18. The method of claim 17, further comprising coupling a second contact microphone to at least one other of a plurality of components of the barrier operator system.

19. The method of claim 17, wherein the contact microphone is wirelessly coupled to the signal processor.

20. The method of claim 17, wherein the signal processor is electronically coupled with a controller that controls operation of the barrier operator.

\* \* \* \* \*